United States Patent
Gao et al.

(10) Patent No.: US 11,715,960 B2
(45) Date of Patent: Aug. 1, 2023

(54) DUAL-BATTERY CHARGING AND DISCHARGING METHOD AND APPARATUS, TERMINAL, AND STORAGE MEDIUM

(71) Applicant: ZTE CORPORATION, Guangdong (CN)

(72) Inventors: Jing Gao, Guangdong (CN); Bin Liu, Guangdong (CN); Ankang Guo, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 331 days.

(21) Appl. No.: 16/980,842

(22) PCT Filed: Jul. 11, 2019

(86) PCT No.: PCT/CN2019/095629
§ 371 (c)(1),
(2) Date: Sep. 14, 2020

(87) PCT Pub. No.: WO2020/011234
PCT Pub. Date: Jan. 16, 2020

(65) Prior Publication Data
US 2021/0021136 A1    Jan. 21, 2021

(30) Foreign Application Priority Data

Jul. 12, 2018 (CN) .......................... 201810766281.X

(51) Int. Cl.
*H02J 7/00* (2006.01)
*H02J 3/00* (2006.01)

(52) U.S. Cl.
CPC ............ *H02J 7/0013* (2013.01); *H02J 3/007* (2020.01); *H02J 7/00712* (2020.01);
(Continued)

(58) Field of Classification Search
CPC ...... H02J 7/0013; H02J 3/007; H02J 7/00712; H02J 7/007188
(Continued)

(56) References Cited

U.S. PATENT DOCUMENTS 5,311,112 A * 5/1994 Creaco .................. H02J 7/0013
320/125
7,285,959 B1 * 10/2007 Collins ............... H01M 10/482
324/426
(Continued)

FOREIGN PATENT DOCUMENTS

CN    206639094 U   * 11/2017
CN    206639094 U     11/2017
(Continued)

OTHER PUBLICATIONS

International search report of PCT Patent Application No. PCT/CN2019/095629 dated Sep. 25, 2019.

*Primary Examiner* — John T Trischler

(57) ABSTRACT

A dual-battery charging and discharging method is described to be used for a dual-screen terminal. The method includes: obtaining a state identifier of the first display screen and a state identifier of the second display screen; determining whether the dual-screen terminal is in a charging state; in response to determining that the dual-screen terminal is in a charging state, controlling the first battery and the second battery to be charged according to the state identifier of the first display screen and the state identifier of the second display screen; and in response to determining that the dual-screen terminal is not in a charging state, controlling whether the first battery and the second battery supply power to the dual-screen terminal according to the state identifier of the first display screen and the state identifier of the second display screen.

6 Claims, 6 Drawing Sheets

(52) U.S. Cl.
CPC ....... *H02J 7/007188* (2020.01); *H02J 7/0068* (2013.01); *H02J 2310/22* (2020.01)

(58) Field of Classification Search
USPC .................................................. 320/107
See application file for complete search history.

(56) References Cited

U.S. PATENT DOCUMENTS

| | | | | |
|---|---|---|---|---|
| 8,271,053 B2* | 9/2012 | Choi | .................. | H02J 7/35 455/343.1 |
| 8,433,373 B2* | 4/2013 | Song | .................. | H04W 52/0261 455/343.1 |
| 8,441,227 B2* | 5/2013 | Choi | .................. | H04M 1/0262 320/101 |
| 8,521,229 B2* | 8/2013 | Naruse | .................. | H04W 52/0261 455/343.1 |
| 8,812,051 B2* | 8/2014 | Jouin | .................. | G09G 5/377 455/452.2 |
| 8,836,842 B2* | 9/2014 | Sirpal | .................. | E05D 3/12 348/333.05 |
| 8,838,095 B2* | 9/2014 | Jouin | .................. | H04M 1/0206 455/435.2 |
| 8,842,057 B2* | 9/2014 | Sirpal | .................. | G06F 3/1454 345/1.3 |
| 8,856,679 B2* | 10/2014 | Sirpal | .................. | H05K 5/0017 715/790 |
| 8,868,135 B2* | 10/2014 | Sirpal | .................. | H04M 1/0216 455/566 |
| 8,872,727 B2* | 10/2014 | Reeves | .................. | H04M 1/0206 345/173 |
| 8,874,894 B2* | 10/2014 | Reeves | .................. | H04W 48/18 345/1.3 |
| 8,878,794 B2* | 11/2014 | Sirpal | .................. | E05D 3/12 345/1.3 |
| 8,884,841 B2* | 11/2014 | Sirpal | .................. | H05K 13/046 345/173 |
| 8,890,768 B2* | 11/2014 | Sirpal | .................. | H04N 21/47 345/173 |
| 8,903,377 B2* | 12/2014 | Jouin | .................. | G06F 3/04817 455/550.1 |
| 8,904,165 B2* | 12/2014 | Reeves | .................. | H04B 1/3833 345/1.3 |
| 8,907,906 B2* | 12/2014 | Sirpal | .................. | G09G 5/377 345/1.3 |
| 8,910,061 B2* | 12/2014 | Reeves | .................. | G06F 3/0488 715/761 |
| 8,949,722 B2* | 2/2015 | Sirpal | .................. | B29D 11/00673 715/744 |
| 8,970,117 B2* | 3/2015 | Sumisaki | .................. | G03B 15/0447 315/159 |
| 8,975,871 B2* | 3/2015 | Hsu | .................. | H02J 9/06 320/140 |
| 8,994,671 B2* | 3/2015 | Reeves | .................. | G06F 3/1438 345/1.3 |
| 8,996,073 B2* | 3/2015 | Sirpal | .................. | G06G 1/00 455/566 |
| 9,003,311 B2* | 4/2015 | Reeves | .................. | G06F 9/44 715/761 |
| 9,013,867 B2* | 4/2015 | Becze | .................. | H04N 21/47 361/679.01 |
| 9,047,038 B2* | 6/2015 | Sirpal | .................. | H05K 13/00 |
| 9,069,518 B2* | 6/2015 | Reeves | .................. | H04N 21/47 |
| 9,075,558 B2* | 7/2015 | Reeves | .................. | G06F 9/451 |
| 9,086,835 B2* | 7/2015 | Becze | .................. | G06F 3/04883 |
| 9,086,836 B2* | 7/2015 | Becze | .................. | H04N 21/4316 |
| 9,092,183 B2* | 7/2015 | Reeves | .................. | G06F 3/04845 |
| 9,104,365 B2* | 8/2015 | Sirpal | .................. | G06F 9/451 |
| 9,104,366 B2* | 8/2015 | Kretz | .................. | G06F 3/0483 |
| 9,116,655 B2* | 8/2015 | Becze | .................. | G06F 3/01 |
| 9,122,440 B2* | 9/2015 | Cassar | .................. | G06F 1/1649 |
| 9,122,441 B2* | 9/2015 | Reeves | .................. | G06F 3/1454 |
| 9,128,659 B2* | 9/2015 | Kretz | .................. | H05K 13/046 |
| 9,128,660 B2* | 9/2015 | Kretz | .................. | G06F 3/044 |
| 9,130,382 B1* | 9/2015 | Luo | .................. | H02H 7/18 |
| 9,141,328 B2* | 9/2015 | Jouin | .................. | H05K 13/046 |
| 9,146,589 B2* | 9/2015 | Sirpal | .................. | G06F 3/0416 |
| 9,152,179 B2* | 10/2015 | Sirpal | .................. | G06F 3/04886 |
| 9,152,371 B2* | 10/2015 | Sirpal | .................. | G06F 3/0482 |
| 9,158,494 B2* | 10/2015 | Sirpal | .................. | G06F 3/04897 |
| 9,164,546 B2* | 10/2015 | Sirpal | .................. | G06F 3/1438 |
| 9,176,701 B2* | 11/2015 | Becze | .................. | G09G 1/00 |
| 9,182,788 B2* | 11/2015 | Sirpal | .................. | G06F 1/1649 |
| 9,182,935 B2* | 11/2015 | Sirpal | .................. | H05K 13/00 |
| 9,185,643 B2* | 11/2015 | Jouin | .................. | G06F 3/0485 |
| 9,195,427 B2* | 11/2015 | Sirpal | .................. | G06F 3/044 |
| 9,201,626 B2* | 12/2015 | Sirpal | .................. | H04N 5/2628 |
| 9,213,516 B2* | 12/2015 | Reeves | .................. | H04M 1/0266 |
| 9,213,517 B2* | 12/2015 | Sirpal | .................. | G06F 3/04845 |
| 9,214,826 B2* | 12/2015 | Skipper | .................. | H02J 7/0068 |
| 9,218,154 B2* | 12/2015 | Reeves | .................. | H05K 5/04 |
| 9,223,535 B2* | 12/2015 | Teltz | .................. | G06F 3/0346 |
| 9,229,675 B2* | 1/2016 | Becze | .................. | H04N 5/232933 |
| 9,235,374 B2* | 1/2016 | Sirpal | .................. | G06F 3/1423 |
| 9,256,390 B2* | 2/2016 | Sirpal | .................. | G06F 3/04842 |
| 9,262,117 B2* | 2/2016 | Sirpal | .................. | H04W 72/06 |
| 9,280,312 B2* | 3/2016 | Sirpal | .................. | G06F 3/0481 |
| 9,286,024 B2* | 3/2016 | Becze | .................. | G06F 1/1605 |
| 9,317,243 B2* | 4/2016 | Becze | .................. | G06F 3/04897 |
| 9,331,498 B2* | 5/2016 | Albsmeier | .................. | H02J 7/1423 |
| 9,331,510 B2* | 5/2016 | Koyama | .................. | H02J 7/007 |
| 9,351,237 B2* | 5/2016 | Selim | .................. | G06F 3/04897 |
| 9,395,945 B2* | 7/2016 | de Paz | .................. | G06F 3/01 |
| 9,474,021 B2* | 10/2016 | Reeves | .................. | G06T 3/20 |
| 9,495,012 B2* | 11/2016 | Reeves | .................. | H04W 68/00 |
| 9,497,697 B2* | 11/2016 | Becze | .................. | G09G 1/00 |
| 9,524,018 B2* | 12/2016 | Sultenfuss | .................. | G06F 1/28 |
| 9,524,027 B2* | 12/2016 | Sirpal | .................. | G06F 3/1446 |
| 9,552,013 B2* | 1/2017 | Kim | .................. | H04W 52/027 |
| 9,582,043 B2* | 2/2017 | Hirakata | .................. | G06F 1/1641 |
| 9,582,235 B2* | 2/2017 | Sirpal | .................. | G06F 1/1637 |
| 9,588,728 B2* | 3/2017 | Lin | .................. | H02J 7/342 |
| 9,590,443 B2* | 3/2017 | Ju | .................. | H02J 7/0048 |
| 9,594,538 B2* | 3/2017 | Jouin | .................. | G06F 3/0483 |
| 9,639,320 B2* | 5/2017 | Reeves | .................. | G06F 3/044 |
| 9,645,607 B2* | 5/2017 | Becze | .................. | G06F 1/1637 |
| 9,645,649 B2* | 5/2017 | Sirpal | .................. | G06F 3/0416 |
| 9,685,805 B2* | 6/2017 | Chen | .................. | G06F 1/1613 |
| 9,690,385 B2* | 6/2017 | Becze | .................. | G06F 9/451 |
| 9,711,994 B2* | 7/2017 | Yamazaki | .................. | H04B 5/0031 |
| 9,811,302 B2* | 11/2017 | Jouin | .................. | H04N 5/23293 |
| 9,830,121 B2* | 11/2017 | Sirpal | .................. | H04W 68/00 |
| 9,877,081 B2* | 1/2018 | Jiang | .................. | H04N 21/42204 |
| 9,904,501 B2* | 2/2018 | Becze | .................. | G06F 1/1692 |
| 9,946,505 B2* | 4/2018 | Becze | .................. | G06F 3/1423 |
| 9,971,381 B2* | 5/2018 | Park | .................. | G06F 1/163 |
| 10,013,226 B2* | 7/2018 | Sirpal | .................. | H05K 5/04 |
| 10,031,567 B2* | 7/2018 | Wilhelmi | .................. | G06F 3/0202 |
| 10,089,054 B2* | 10/2018 | Jouin | .................. | G06F 3/1423 |
| 10,097,021 B2* | 10/2018 | Horie | .................. | H02J 7/0042 |
| 10,139,660 B2* | 11/2018 | Hirakata | .................. | G06F 1/1652 |
| 10,168,973 B2* | 1/2019 | Reeves | .................. | G06F 1/1641 |
| 10,168,975 B2* | 1/2019 | Sirpal | .................. | H05K 5/0017 |
| 10,177,802 B2* | 1/2019 | Berneth | .................. | G06F 1/1656 |
| 10,209,940 B2* | 2/2019 | Sirpal | .................. | G06F 3/04842 |
| 10,277,063 B2* | 4/2019 | Kwon | .................. | H02J 9/002 |
| 10,312,719 B2* | 6/2019 | Files | .................. | H02J 50/12 |
| 10,445,044 B2* | 10/2019 | Sirpal | .................. | H04W 68/00 |
| 10,466,951 B2* | 11/2019 | Sirpal | .................. | G06F 1/1605 |
| 10,474,410 B2* | 11/2019 | Sirpal | .................. | G06F 3/0486 |
| 10,503,454 B2* | 12/2019 | Sirpal | .................. | B29D 11/00673 |
| 10,514,877 B2* | 12/2019 | Becze | .................. | H04W 48/18 |
| 10,528,312 B2* | 1/2020 | Reeves | .................. | G02B 6/0001 |
| 10,530,189 B2* | 1/2020 | Yamazaki | .................. | H02J 50/40 |
| 10,545,712 B2* | 1/2020 | Reeves | .................. | G06F 1/1683 |
| 10,559,964 B2* | 2/2020 | Kim | .................. | H04W 52/0209 |
| 10,613,362 B2* | 4/2020 | Hirakata | .................. | G02F 1/133305 |
| 10,678,314 B2* | 6/2020 | Ho | .................. | H05K 7/20381 |
| 10,740,058 B2* | 8/2020 | Sirpal | .................. | G02B 6/0001 |
| 10,742,042 B2* | 8/2020 | Files | .................. | H01M 10/46 |
| 10,778,013 B2* | 9/2020 | Kristjansson | .................. | H02J 7/0071 |
| 10,784,541 B2* | 9/2020 | Teng | .................. | H02J 7/00032 |

(56) References Cited

U.S. PATENT DOCUMENTS

| | | | | |
|---|---|---|---|---|
| 10,790,695 B2* | 9/2020 | Tong | | H02J 50/10 |
| 10,795,420 B2* | 10/2020 | Wilhelmi | | G06F 1/1632 |
| 10,853,013 B2* | 12/2020 | Sirpal | | H04N 5/222 |
| 10,853,016 B2* | 12/2020 | Sirpal | | H05K 5/0017 |
| 10,862,316 B2* | 12/2020 | Baby | | H02J 7/0014 |
| 10,910,870 B2* | 2/2021 | Horie | | H02J 7/0042 |
| 10,936,032 B2* | 3/2021 | Liu | | G06F 13/4282 |
| 10,963,007 B2* | 3/2021 | de Paz | | G06F 3/04883 |
| 11,038,364 B2* | 6/2021 | Kristjansson | | H02J 7/00714 |
| 11,043,851 B2* | 6/2021 | Yamazaki | | H02J 50/20 |
| 11,061,264 B2* | 7/2021 | Hirakata | | G02F 1/133308 |
| 11,101,680 B2* | 8/2021 | Kristjansson | | H02J 7/008 |
| 11,133,535 B2* | 9/2021 | Kim | | H02J 7/342 |
| 11,137,796 B2* | 10/2021 | Sirpal | | G06F 3/04883 |
| 11,165,265 B2* | 11/2021 | Kristjansson | | G06F 1/1635 |
| 11,216,032 B2* | 1/2022 | Ushijima | | G06K 7/0004 |
| 11,221,646 B2* | 1/2022 | Sirpal | | G06F 1/1605 |
| 11,221,647 B2* | 1/2022 | Sirpal | | G06F 1/1616 |
| 11,221,649 B2* | 1/2022 | Sirpal | | G06F 3/017 |
| 11,258,280 B2* | 2/2022 | Li | | H01R 13/2421 |
| 11,262,792 B2* | 3/2022 | de Paz | | G06F 1/1641 |
| 11,327,526 B2* | 5/2022 | Reeves | | H05K 5/0226 |
| 11,429,146 B2* | 8/2022 | Sirpal | | G06F 3/0487 |
| 11,474,646 B2* | 10/2022 | Yamazaki | | G06F 1/26 |
| 11,495,978 B2* | 11/2022 | Baby | | G06F 1/1647 |
| 2007/0114852 A1* | 5/2007 | Lin | | H02J 1/10 |
| | | | | 307/66 |
| 2009/0214912 A1* | 8/2009 | Horiguchi | | G03B 17/18 |
| | | | | 429/429 |
| 2010/0130260 A1* | 5/2010 | Naruse | | H04W 52/0261 |
| | | | | 455/566 |
| 2011/0009172 A1* | 1/2011 | Song | | H04M 1/72427 |
| | | | | 455/566 |
| 2011/0101913 A1* | 5/2011 | Matsumoto | | H01M 10/441 |
| | | | | 320/162 |
| 2011/0109259 A1* | 5/2011 | Choi | | H04M 1/0262 |
| | | | | 320/101 |
| 2011/0238343 A1* | 9/2011 | Kamiya | | G01R 31/392 |
| | | | | 702/63 |
| 2012/0043917 A1* | 2/2012 | Riach | | B60L 50/60 |
| | | | | 318/139 |
| 2012/0043937 A1* | 2/2012 | Williams | | H02J 7/0044 |
| | | | | 320/114 |
| 2012/0242807 A1* | 9/2012 | Umezu | | G03B 35/08 |
| | | | | 348/E13.044 |
| 2012/0299530 A1* | 11/2012 | Hsu | | H02J 7/34 |
| | | | | 320/103 |
| 2012/0319643 A1* | 12/2012 | Wang | | H02J 7/00 |
| | | | | 320/107 |
| 2013/0063076 A1* | 3/2013 | Shen | | H02J 7/32 |
| | | | | 320/107 |
| 2013/0076591 A1* | 3/2013 | Sirpal | | H04M 1/0216 |
| | | | | 345/1.3 |
| 2013/0076595 A1* | 3/2013 | Sirpal | | G06F 3/1438 |
| | | | | 345/1.3 |
| 2013/0076596 A1* | 3/2013 | de Paz | | G06F 1/1641 |
| | | | | 345/1.3 |
| 2013/0076597 A1* | 3/2013 | Becze | | H04N 5/23293 |
| | | | | 345/1.3 |
| 2013/0076598 A1* | 3/2013 | Sirpal | | G09G 1/00 |
| | | | | 345/1.3 |
| 2013/0076632 A1* | 3/2013 | Sirpal | | G06F 3/0346 |
| | | | | 345/168 |
| 2013/0076637 A1* | 3/2013 | Teltz | | H04W 24/02 |
| | | | | 345/169 |
| 2013/0076638 A1* | 3/2013 | Sirpal | | G06F 3/041 |
| | | | | 345/169 |
| 2013/0076653 A1* | 3/2013 | Selim | | G06F 3/1446 |
| | | | | 345/1.3 |
| 2013/0076654 A1* | 3/2013 | Sirpal | | G06F 3/1423 |
| | | | | 345/1.3 |
| 2013/0076655 A1* | 3/2013 | Sirpal | | G06F 3/00 |
| | | | | 345/1.3 |
| 2013/0076656 A1* | 3/2013 | Sirpal | | G09G 5/12 |
| | | | | 345/173 |
| 2013/0076657 A1* | 3/2013 | Reeves | | H04N 5/2628 |
| | | | | 345/173 |
| 2013/0076658 A1* | 3/2013 | Cassar | | G09G 5/377 |
| | | | | 345/173 |
| 2013/0076660 A1* | 3/2013 | Reeves | | H04N 5/2628 |
| | | | | 345/1.3 |
| 2013/0076661 A1* | 3/2013 | Reeves | | G06F 1/1692 |
| | | | | 345/1.3 |
| 2013/0076662 A1* | 3/2013 | Sirpal | | G06F 3/0346 |
| | | | | 345/173 |
| 2013/0076663 A1* | 3/2013 | Sirpal | | H05K 5/04 |
| | | | | 345/1.3 |
| 2013/0076664 A1* | 3/2013 | Reeves | | G06F 1/1643 |
| | | | | 345/173 |
| 2013/0076665 A1* | 3/2013 | Reeves | | G06F 1/1637 |
| | | | | 345/1.3 |
| 2013/0076672 A1* | 3/2013 | Sirpal | | H04W 68/00 |
| | | | | 345/173 |
| 2013/0076673 A1* | 3/2013 | Sirpal | | G09G 5/373 |
| | | | | 345/173 |
| 2013/0076677 A1* | 3/2013 | Kretz | | H04W 72/06 |
| | | | | 345/1.3 |
| 2013/0076678 A1* | 3/2013 | Kretz | | G06F 3/1438 |
| | | | | 345/173 |
| 2013/0076679 A1* | 3/2013 | Kretz | | G06F 3/01 |
| | | | | 345/173 |
| 2013/0076680 A1* | 3/2013 | Jouin | | G06F 3/1423 |
| | | | | 345/173 |
| 2013/0076681 A1* | 3/2013 | Sirpal | | G06F 3/01 |
| | | | | 345/173 |
| 2013/0076682 A1* | 3/2013 | de Paz | | G06F 3/1446 |
| | | | | 345/173 |
| 2013/0076683 A1* | 3/2013 | Reeves | | G06F 1/1641 |
| | | | | 345/173 |
| 2013/0076715 A1* | 3/2013 | Selim | | G06F 3/048 |
| | | | | 345/211 |
| 2013/0076718 A1* | 3/2013 | Sirpal | | G06F 1/1641 |
| | | | | 345/211 |
| 2013/0076780 A1* | 3/2013 | Reeves | | G06F 3/1446 |
| | | | | 345/619 |
| 2013/0076781 A1* | 3/2013 | Sirpal | | H05K 5/04 |
| | | | | 345/619 |
| 2013/0076782 A1* | 3/2013 | Sirpal | | G06F 16/54 |
| | | | | 345/1.3 |
| 2013/0076793 A1* | 3/2013 | Sirpal | | G06F 1/1692 |
| | | | | 345/173 |
| 2013/0076795 A1* | 3/2013 | Sirpal | | G09G 5/12 |
| | | | | 345/169 |
| 2013/0076929 A1* | 3/2013 | Sirpal | | G06F 1/1643 |
| | | | | 348/E5.025 |
| 2013/0076961 A1* | 3/2013 | Sirpal | | G06F 1/1677 |
| | | | | 348/E5.022 |
| 2013/0076963 A1* | 3/2013 | Sirpal | | G09G 5/14 |
| | | | | 348/333.01 |
| 2013/0076964 A1* | 3/2013 | Sirpal | | G09G 1/00 |
| | | | | 348/333.12 |
| 2013/0077221 A1* | 3/2013 | Becze | | G06F 1/1649 |
| | | | | 312/223.1 |
| 2013/0077236 A1* | 3/2013 | Becze | | G06F 1/1643 |
| | | | | 361/679.56 |
| 2013/0077260 A1* | 3/2013 | Sirpal | | H04W 68/00 |
| | | | | 361/728 |
| 2013/0078959 A1* | 3/2013 | Reeves | | G06F 3/1446 |
| | | | | 455/412.2 |
| 2013/0078994 A1* | 3/2013 | Jouin | | G06F 3/04817 |
| | | | | 455/552.1 |
| 2013/0078995 A1* | 3/2013 | Jouin | | B29D 11/00673 |
| | | | | 455/552.1 |
| 2013/0079054 A1* | 3/2013 | Jouin | | G06T 3/00 |
| | | | | 455/552.1 |
| 2013/0079055 A1* | 3/2013 | Jouin | | G06F 3/04845 |
| | | | | 455/552.1 |
| 2013/0079062 A1* | 3/2013 | Sirpal | | H04N 21/47 |
| | | | | 455/566 |

(56) References Cited

U.S. PATENT DOCUMENTS

| | | | | |
|---|---|---|---|---|
| 2013/0079063 A1* | 3/2013 | Jouin | G06F 3/0482 | 455/566 |
| 2013/0080759 A1* | 3/2013 | Reeves | G06F 3/04847 | 713/100 |
| 2013/0080929 A1* | 3/2013 | Sirpal | G02B 6/0001 | 715/761 |
| 2013/0080931 A1* | 3/2013 | Sirpal | H05K 13/046 | 715/761 |
| 2013/0080932 A1* | 3/2013 | Sirpal | H05K 13/00 | 345/1.3 |
| 2013/0080933 A1* | 3/2013 | Reeves | H05K 13/046 | 715/761 |
| 2013/0080934 A1* | 3/2013 | Reeves | G06F 3/04883 | 715/761 |
| 2013/0080935 A1* | 3/2013 | Reeves | G06F 3/0412 | 715/761 |
| 2013/0080936 A1* | 3/2013 | Reeves | G06F 3/04897 | 715/761 |
| 2013/0080937 A1* | 3/2013 | Sirpal | B29D 11/00673 | 715/761 |
| 2013/0080938 A1* | 3/2013 | Reeves | G09G 5/34 | 715/761 |
| 2013/0080939 A1* | 3/2013 | Reeves | G06F 1/1683 | 715/761 |
| 2013/0080945 A1* | 3/2013 | Reeves | H05K 7/1452 | 715/761 |
| 2013/0080956 A1* | 3/2013 | Sirpal | G06F 9/00 | 715/769 |
| 2013/0080957 A1* | 3/2013 | Sirpal | G06F 1/1649 | 715/769 |
| 2013/0080958 A1* | 3/2013 | Sirpal | G06F 1/1677 | 715/769 |
| 2013/0080970 A1* | 3/2013 | Sirpal | G06F 3/01 | 715/790 |
| 2013/0082585 A1* | 4/2013 | Becze | G06F 3/1446 | 29/428 |
| 2013/0082638 A1* | 4/2013 | Liang | H02J 7/0013 | 320/103 |
| 2013/0082955 A1* | 4/2013 | Becze | G06F 3/0484 | 345/173 |
| 2013/0082957 A1* | 4/2013 | Reeves | H04B 1/3833 | 345/173 |
| 2013/0082958 A1* | 4/2013 | Reeves | G06F 1/1649 | 345/173 |
| 2013/0083242 A1* | 4/2013 | Sirpal | G06F 1/1643 | 348/564 |
| 2013/0083464 A1* | 4/2013 | Becze | G06F 3/0483 | 361/749 |
| 2013/0083466 A1* | 4/2013 | Becze | H04W 88/06 | 29/434 |
| 2013/0083467 A1* | 4/2013 | Becze | G06F 9/44 | 361/679.27 |
| 2013/0083468 A1* | 4/2013 | Becze | G06F 1/1677 | 361/679.3 |
| 2013/0083469 A1* | 4/2013 | Becze | H05K 7/02 | 29/434 |
| 2013/0083470 A1* | 4/2013 | Becze | B29D 11/00673 | 312/223.2 |
| 2013/0083477 A1* | 4/2013 | Becze | G06F 3/0412 | 361/679.41 |
| 2013/0083558 A1* | 4/2013 | Becze | G06F 1/1637 | 264/1.24 |
| 2013/0086480 A1* | 4/2013 | Sirpal | G06F 3/017 | 715/744 |
| 2013/0086492 A1* | 4/2013 | Sirpal | G06F 16/51 | 715/761 |
| 2013/0086493 A1* | 4/2013 | Reeves | G06F 1/1637 | 715/761 |
| 2013/0086494 A1* | 4/2013 | Sirpal | G06F 3/041 | 715/761 |
| 2013/0086505 A1* | 4/2013 | de Paz | G06F 3/0481 | 715/773 |
| 2013/0088411 A1* | 4/2013 | Reeves | G06F 3/017 | 345/1.3 |
| 2013/0088446 A1* | 4/2013 | Sirpal | G06F 3/04842 | 345/173 |
| 2013/0088447 A1* | 4/2013 | Becze | G06F 1/1618 | 345/173 |
| 2013/0091439 A1* | 4/2013 | Sirpal | G06F 3/167 | 715/752 |
| 2013/0097532 A1* | 4/2013 | Reeves | G06F 1/1618 | 715/761 |
| 2013/0100001 A1* | 4/2013 | Reeves | G06F 1/1605 | 345/1.3 |
| 2013/0113835 A1* | 5/2013 | Sirpal | G06F 9/451 | 345/649 |
| 2013/0187831 A1* | 7/2013 | Sirpal | H04M 1/0266 | 345/1.3 |
| 2013/0219162 A1* | 8/2013 | Reeves | G06F 9/44 | 713/100 |
| 2013/0257354 A1* | 10/2013 | Koyama | H02J 7/007 | 320/107 |
| 2013/0271067 A1* | 10/2013 | Yu | H02J 7/0044 | 320/107 |
| 2013/0307473 A1* | 11/2013 | Han | H02J 7/04 | 320/108 |
| 2014/0070760 A1* | 3/2014 | Albsmeier | H02J 7/342 | 320/107 |
| 2014/0084852 A1* | 3/2014 | Yang | G06F 1/263 | 307/112 |
| 2014/0184162 A1* | 7/2014 | Takahashi | H01M 10/0525 | 320/128 |
| 2014/0217986 A1* | 8/2014 | Skipper | H02J 7/0068 | 320/128 |
| 2014/0285498 A1* | 9/2014 | Kim | G06F 1/1601 | 345/501 |
| 2014/0368159 A1* | 12/2014 | Han | H02M 3/155 | 320/162 |
| 2015/0009237 A1* | 1/2015 | Sirpal | G06F 3/041 | 345/659 |
| 2015/0029227 A1* | 1/2015 | Park | G06F 1/163 | 345/659 |
| 2015/0062525 A1* | 3/2015 | Hirakata | G02F 1/133305 | 349/158 |
| 2015/0067362 A1* | 3/2015 | Sultenfuss | G06F 1/30 | 713/320 |
| 2015/0087355 A1* | 3/2015 | Jouin | G02B 6/0001 | 455/552.1 |
| 2015/0130700 A1* | 5/2015 | Chen | H02J 7/0044 | 345/156 |
| 2015/0137758 A1* | 5/2015 | Taga | H02J 7/0045 | 320/112 |
| 2015/0205562 A1* | 7/2015 | Lin | H02J 7/342 | 345/1.1 |
| 2015/0222141 A1* | 8/2015 | Yamazaki | H02J 50/20 | 320/108 |
| 2016/0041669 A1* | 2/2016 | de Paz | G06F 3/017 | 345/173 |
| 2016/0041704 A1* | 2/2016 | Reeves | G06F 3/00 | 715/761 |
| 2016/0041757 A1* | 2/2016 | Sirpal | G06F 3/167 | 345/173 |
| 2016/0048165 A1* | 2/2016 | Becze | H05K 7/1452 | 361/679.27 |
| 2016/0048222 A1* | 2/2016 | Sirpal | G06F 1/1647 | 345/156 |
| 2016/0048300 A1* | 2/2016 | Sirpal | H04W 24/02 | 715/761 |
| 2016/0054869 A1* | 2/2016 | Sirpal | B29D 11/00673 | 715/761 |
| 2016/0054880 A1* | 2/2016 | Sirpal | G06F 1/1683 | 715/761 |
| 2016/0054970 A1* | 2/2016 | Reeves | G06F 3/1446 | 715/761 |
| 2016/0062393 A1* | 3/2016 | Sirpal | G06F 3/048 | 345/173 |
| 2016/0078591 A1* | 3/2016 | Reeves | G02B 6/0001 | 345/1.3 |

(56) References Cited

U.S. PATENT DOCUMENTS

| | | | |
|---|---|---|---|
| 2016/0085384 A1* | 3/2016 | Selim | G02B 6/0001 715/761 |
| 2016/0085406 A1* | 3/2016 | Sirpal | H04N 21/4316 715/761 |
| 2016/0098064 A1* | 4/2016 | Becze | G06F 3/0485 361/679.3 |
| 2016/0110149 A1* | 4/2016 | Sirpal | H05K 13/00 345/1.3 |
| 2016/0116943 A1* | 4/2016 | Becze | G06F 3/01 361/679.28 |
| 2016/0117139 A1* | 4/2016 | Reeves | H05K 5/04 715/761 |
| 2016/0149428 A1* | 5/2016 | Nunami | G06F 1/1632 320/136 |
| 2016/0179208 A1* | 6/2016 | Reeves | G06F 3/048 715/761 |
| 2016/0179350 A1* | 6/2016 | Reeves | G09G 5/377 715/719 |
| 2016/0183047 A1* | 6/2016 | Jouin | G06F 3/0416 455/552.1 |
| 2016/0196007 A1* | 7/2016 | Reeves | G02B 6/0001 715/761 |
| 2016/0241066 A1* | 8/2016 | Kim | H04W 52/0209 |
| 2016/0266759 A1* | 9/2016 | Reeves | H04N 5/2628 |
| 2016/0291916 A1* | 10/2016 | Sirpal | G06F 3/048 |
| 2016/0291920 A1* | 10/2016 | Sirpal | H04M 1/0216 |
| 2016/0291923 A1* | 10/2016 | Sirpal | G06F 3/04897 |
| 2016/0313964 A1* | 10/2016 | de Paz | G06F 3/04897 |
| 2016/0363977 A1* | 12/2016 | Wilhelmi | G06F 1/1632 |
| 2017/0031641 A1* | 2/2017 | Reeves | H04W 4/02 |
| 2017/0052634 A1* | 2/2017 | Reeves | G06F 1/1692 |
| 2017/0063123 A1* | 3/2017 | Horie | H02J 7/00712 |
| 2017/0201801 A1* | 7/2017 | Jiang | H04N 21/4221 |
| 2017/0227807 A1* | 8/2017 | Hirakata | G06F 1/1652 |
| 2017/0302100 A1* | 10/2017 | Yamazaki | H04B 5/0037 |
| 2017/0331507 A1* | 11/2017 | Berneth | H04M 1/0266 |
| 2018/0026316 A1* | 1/2018 | Teng | H01M 10/44 320/134 |
| 2018/0060012 A1* | 3/2018 | Jouin | G06F 1/1637 |
| 2018/0074776 A1* | 3/2018 | Sirpal | G06F 1/1605 |
| 2018/0090730 A1* | 3/2018 | Ai | H05K 5/0217 |
| 2018/0129460 A1* | 5/2018 | Sirpal | G06F 1/1677 |
| 2018/0138725 A1* | 5/2018 | Taga | H01M 10/46 |
| 2018/0181361 A1* | 6/2018 | Becze | G06F 3/1446 |
| 2018/0198308 A1* | 7/2018 | Files | H04B 5/0037 |
| 2018/0232191 A1* | 8/2018 | Becze | G06F 3/04847 |
| 2018/0253273 A1* | 9/2018 | de Paz | G06F 16/51 |
| 2018/0307456 A1* | 10/2018 | Sirpal | H04M 1/0216 |
| 2018/0321723 A1* | 11/2018 | Wilhelmi | G06F 1/1632 |
| 2018/0366967 A1* | 12/2018 | Horie | H02J 7/007182 |
| 2019/0006722 A1* | 1/2019 | Kim | H01M 10/425 |
| 2019/0068233 A1* | 2/2019 | Berneth | H04M 1/0252 |
| 2019/0081487 A1* | 3/2019 | Baby | H02J 7/007 |
| 2019/0155561 A1* | 5/2019 | Reeves | G06F 3/0484 |
| 2019/0163007 A1* | 5/2019 | Hirakata | G02F 1/133308 |
| 2019/0187947 A1* | 6/2019 | Sirpal | G06F 3/0346 |
| 2019/0214831 A1* | 7/2019 | Kristjansson | G06F 1/263 |
| 2019/0214837 A1* | 7/2019 | Kristjansson | H02J 7/0013 |
| 2019/0346895 A1* | 11/2019 | Ho | H01M 10/617 |
| 2020/0005007 A1* | 1/2020 | Ushijima | G06F 1/1633 |
| 2020/0042270 A1* | 2/2020 | Reeves | G06F 3/041 |
| 2020/0042271 A1* | 2/2020 | de Paz | G09G 5/373 |
| 2020/0042272 A1* | 2/2020 | de Paz | G06F 3/0483 |
| 2020/0065045 A1* | 2/2020 | Reeves | G06F 3/0488 |
| 2020/0065046 A1* | 2/2020 | Sirpal | H05K 5/0226 |
| 2020/0065047 A1* | 2/2020 | Becze | H05K 13/00 |
| 2020/0083721 A1* | 3/2020 | Diao | H02J 7/0048 |
| 2020/0089460 A1* | 3/2020 | Sirpal | H04W 68/00 |
| 2020/0096774 A1* | 3/2020 | Trail | G02B 27/0176 |
| 2020/0106288 A1* | 4/2020 | Tong | H02J 50/40 |
| 2020/0110566 A1* | 4/2020 | Reeves | H04W 48/18 |
| 2020/0112203 A1* | 4/2020 | Yamazaki | H02J 7/0044 |
| 2020/0125313 A1* | 4/2020 | Reeves | B29D 11/00673 |
| 2020/0161872 A1* | 5/2020 | Files | H02J 7/0068 |
| 2020/0169101 A1* | 5/2020 | Li | H02J 7/342 |
| 2020/0192621 A1* | 6/2020 | Sirpal | G06F 1/1618 |
| 2020/0210132 A1* | 7/2020 | Becze | G06F 3/0485 |
| 2020/0269620 A1* | 8/2020 | Hanagami | H01M 50/20 |
| 2020/0292872 A1* | 9/2020 | Hirakata | G06F 1/1641 |
| 2020/0373778 A1* | 11/2020 | Gong | H02J 7/0048 |
| 2020/0393883 A1* | 12/2020 | Yamazaki | G06F 3/044 |
| 2020/0395765 A1* | 12/2020 | Kristjansson | H02J 7/342 |
| 2020/0395778 A1* | 12/2020 | Obie | G04G 21/04 |
| 2020/0412132 A1* | 12/2020 | Kristjansson | H02J 7/00712 |
| 2020/0412136 A1* | 12/2020 | Kristjansson | G06F 1/28 |
| 2021/0019104 A1* | 1/2021 | Sirpal | G06F 3/00 |
| 2021/0021137 A1* | 1/2021 | Zeng | H01M 10/46 |
| 2021/0028634 A1* | 1/2021 | Taga | H01M 10/46 |
| 2021/0135478 A1* | 5/2021 | Schline | G06F 1/3212 |
| 2021/0149444 A1* | 5/2021 | Sirpal | G06F 3/0485 |
| 2021/0167611 A1* | 6/2021 | Baby | G06F 1/1635 |
| 2021/0184601 A1* | 6/2021 | Lee | G06F 1/1635 |
| 2021/0223819 A1* | 7/2021 | Sirpal | H05K 13/046 |
| 2021/0234391 A1* | 7/2021 | Kristjansson | H02J 7/342 |
| 2021/0242830 A1* | 8/2021 | Jang | H02J 7/35 |
| 2021/0257861 A1* | 8/2021 | Yamazaki | H02J 7/342 |
| 2021/0333611 A1* | 10/2021 | Hirakata | G02F 1/133308 |
| 2022/0006315 A1* | 1/2022 | Dou | H02J 7/007192 |
| 2022/0029439 A1* | 1/2022 | Justin | H02J 7/0048 |
| 2022/0077695 A1* | 3/2022 | Choi | H02J 7/0016 |
| 2022/0200318 A1* | 6/2022 | Yoon | H02J 7/0018 |
| 2022/0224135 A1* | 7/2022 | Matsumura | G06N 3/08 |
| 2022/0247190 A1* | 8/2022 | Kang | H02J 7/0042 |
| 2022/0255326 A1* | 8/2022 | Carlson | H02J 50/00 |
| 2022/0260299 A1* | 8/2022 | Hori | F25D 29/003 |
| 2022/0263337 A1* | 8/2022 | Mitani | H02J 7/34 |
| 2022/0329110 A1* | 10/2022 | Yoon | H01Q 7/00 |
| 2022/0337073 A1* | 10/2022 | Ha | H02J 7/0047 |

FOREIGN PATENT DOCUMENTS

| | | | | |
|---|---|---|---|---|
| CN | 108988453 A | * | 12/2018 | H02J 7/0016 |
| CN | 109980724 A | * | 7/2019 | |
| KR | 20160125611 A | * | 11/2016 | |
| WO | WO-2020020053 A1 | * | 1/2020 | H02J 7/0016 |

\* cited by examiner

DUAL-BATTERY CHARGING AND DISCHARGING METHOD AND APPARATUS, TERMINAL, AND STORAGE MEDIUM

FIELD OF THE INVENTION

The present disclosure relates to (but is not limited to) the technology of charging and discharging of terminals with dual batteries.

BACKGROUND OF THE INVENTION

With the development of various types of applications of terminal devices, the number of built-in applications is gradually increasing, and the power consumption of entire devices is also increasing. How to improve the standby time of terminal devices has become a research topic in front of various manufacturers. Increasing battery capacity is the simplest and most straightforward way to extend standby time.

Current terminal devices adopt a lightening and thinning design, leaving limited space for batteries. In addition to using new materials to increase cell density, a solution of dual batteries is another solution to increase battery capacity. New materials are costly and time-consuming for stability verification, while the solution of dual batteries is low in cost and flexible in layout and therefore gradually receiving more attention.

SUMMARY OF THE INVENTION

According to one aspect of the present disclosure, provided is a dual-battery charging and discharging method used for a dual-screen terminal, the dual-screen terminal including a first display screen, a second display screen, a first battery, and a second battery, wherein the first battery is placed at a back surface of the first display screen, and the second battery is placed at a back surface of the second display screen, the method including: obtaining a state identifier of the first display screen and a state identifier of the second display screen, wherein the state identifier of the first display screen is used to indicate whether the first display screen is in a working state, and the state identifier of the second display screen is used to indicate whether the second display screen is in a working state; determining whether the dual-screen terminal is in a charging state; in response to determining that the dual-screen terminal is in a charging state, controlling the first battery and the second battery to be charged according to the state identifier of the first display screen and the state identifier of the second display screen; and in response to determining that the dual-screen terminal is not in a charging state, controlling whether the first battery and the second battery supply power to the dual-screen terminal according to the state identifier of the first display screen and the state identifier of the second display screen.

According to another aspect of the present disclosure, provided is a dual-battery charging and discharging apparatus used for a dual-screen terminal, the dual-screen terminal including a first display screen, a second display screen, a first battery, and a second battery, wherein the first battery is placed at a back surface of the first display screen, and the second battery is placed at a back surface of the second display screen, the apparatus including: an obtaining module configured to obtain a state identifier of the first display screen and a state identifier of the second display screen, wherein the state identifier of the first display screen is used to indicate whether the first display screen is in a working state, and the state identifier of the second display screen is used to indicate whether the second display screen is in a working state; a determining module configured to determine whether the dual-screen terminal is in a charging state; a first control module configured to control the first battery and the second battery to be charged according to the state identifier of the first display screen and the state identifier of the second display screen in response to determining that the dual-screen terminal is in a charging state; and a second control module configured to control whether the first battery and the second battery supply power to the dual-screen terminal according to the state identifier of the first display screen and the state identifier of the second display screen in response to determining that the dual-screen terminal is not in a charging state.

According to yet another aspect of the present disclosure, provided is a dual-screen terminal, including a first display screen, a second display screen, a first battery, and a second battery, wherein the first battery is placed at a back surface of the first display screen, and the second battery is placed at a back surface of the second display screen, the dual-screen terminal further including a processor and a memory, wherein the memory stores therein a computer program, and when the processor executes the computer program, the processor implements the dual-battery charging and discharging method according to the present disclosure.

According to yet another aspect of the present disclosure, provided is a storage medium storing thereon a computer program, wherein when the computer program is executed by a processor, the processor implements the dual-battery charging and discharging method according to the present disclosure.

DETAILED DESCRIPTION OF THE EMBODIMENTS

The technical solutions in embodiments of the present disclosure will be clearly and completely described below in conjunction with drawings in the embodiments of the present disclosure.

The solution of dual batteries increases battery capacity, but during a charging/discharging process, two batteries generate heat. When the heat accumulates and reaches a certain temperature, it will bring security risks. In order to eliminate the security risks, it is possible to determine whether to charge and discharge the batteries by detecting whether the temperatures of the batteries exceed a set threshold. However, this solution is costly and requires an additional battery temperature detection module. Due to the limited space in a terminal device, the battery temperature detection module is susceptible to heat interference from other adjacent modules, resulting in a test temperature that does not match the actual temperature, causing abnormal battery charging and discharging, thereby causing a terminal system to fail to work normally. In addition, it is difficult to set the temperature threshold. A terminal device has different heating conditions in various application scenarios. It is necessary to set the battery charging and discharging threshold according to different scenarios, otherwise it will cause abnormal operation. Therefore, the existing method for reducing heat generated by charging and discharging a dual-battery terminal easily leads to abnormal charging and discharging of dual batteries.

Figure 1:
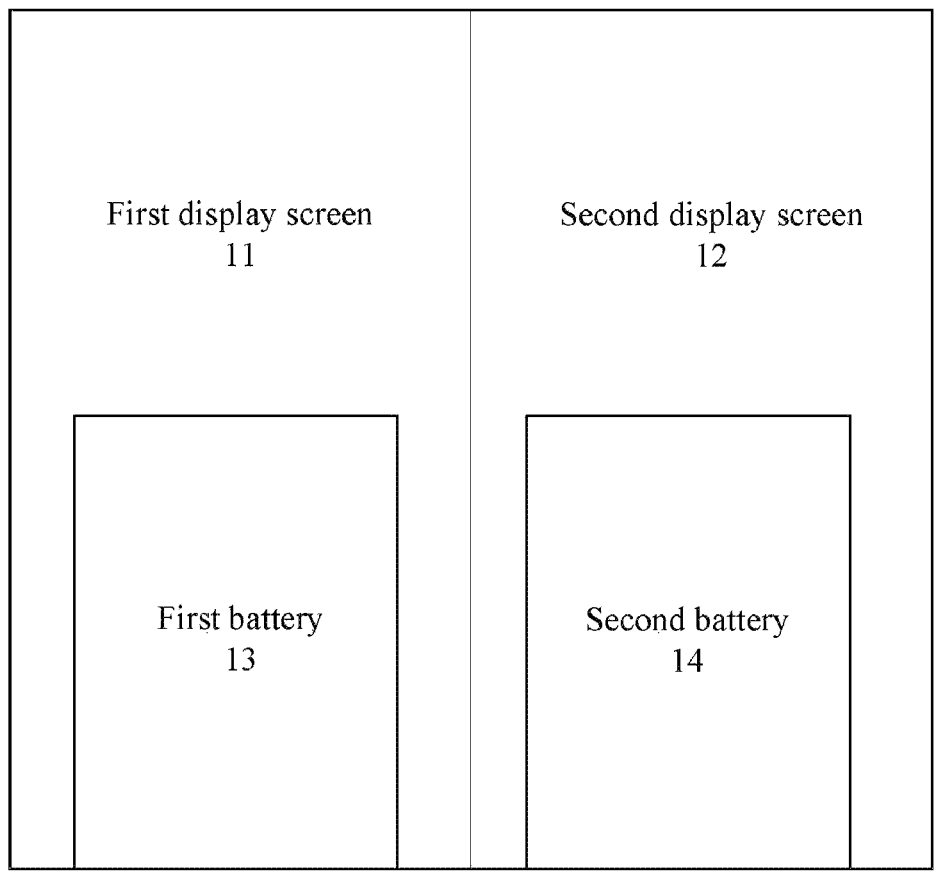
FIG. 1 is a schematic diagram showing a structure of display screens and batteries according to an embodiment of the present disclosure.

An embodiment of the present disclosure provides a dual-battery charging and discharging method used for a dual-screen terminal. FIG. 1 is a schematic diagram showing a structure of display screens and batteries according to an embodiment of the present disclosure.

As shown in FIG. 1, a dual-screen terminal may include a first display screen 11, a second display screen 12, a first battery 13, and a second battery 14. The first battery 13 is placed at a back surface of the first display screen 11, and the second battery 14 is placed at a back surface of the second display screen 12.

Figure 2:
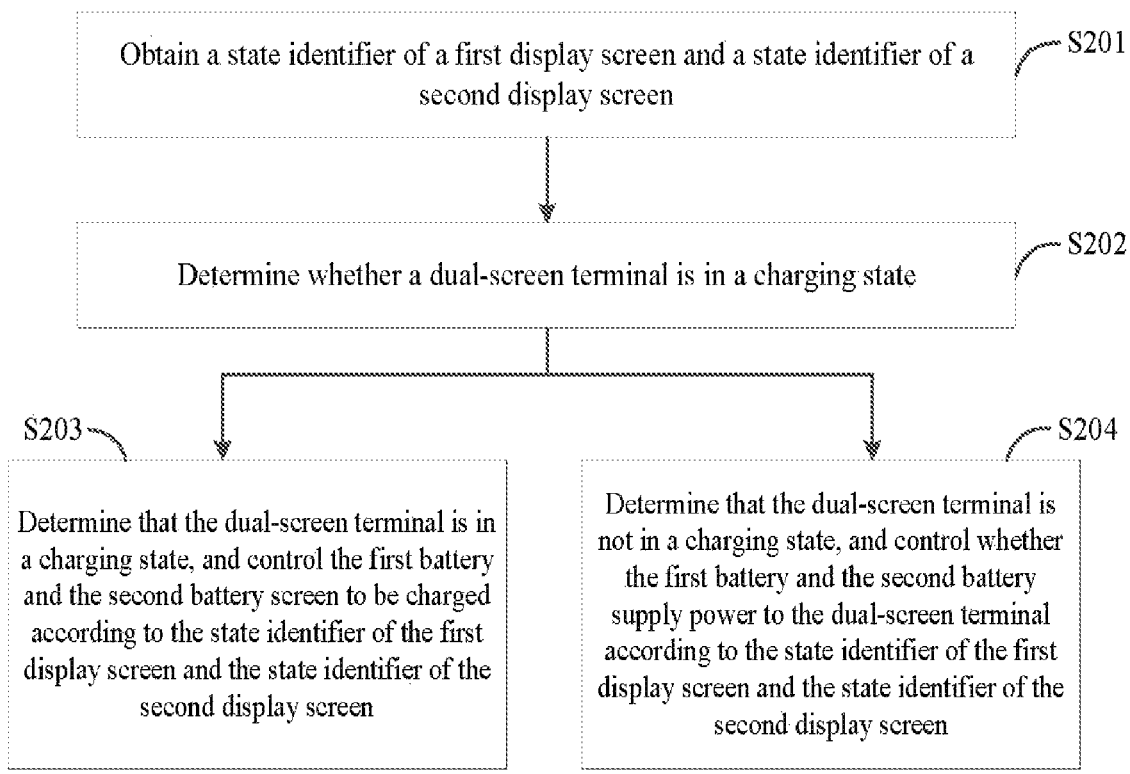
FIG. 2 is a schematic flowchart of a dual-battery charging and discharging method according to an embodiment of the present disclosure.

FIG. 2 is a schematic flowchart of a dual-battery charging and discharging method according to an embodiment of the present disclosure.

As shown in FIG. 2, the dual-battery charging and discharging method according to the embodiment of the present disclosure may include steps S201 to S204.

At step S201, a state identifier of a first display screen and a state identifier of a second display screen are obtained.

In the control method of determining dual-battery charging and discharging by a threshold value, an abnormal battery charging and discharging state may occur, causing a terminal system to fail to work normally. In order to avoid the abnormal battery charging and discharging state, in the embodiment of the present disclosure, the state identifier of the first display screen and the state identifier of the second display screen may be obtained first.

The state identifiers are used to indicate whether the first display screen or the second display screen is in a working state. For example, the state identifier of the first display screen is used to indicate whether the first display screen is in a working state, and the state identifier of the second display screen is used to indicate whether the second display screen is in a working state.

In the dual-screen terminal, the first display screen and the second display screen may be in a working state simultaneously; only one of the first display screen and the second display screen may be in a working state while the other may not be in a working state; or neither of the first display screen and the second display screen may be in a working state. By obtaining the state identifier of the first display screen and the state identifier of the second display screen, it can be determined whether the first display screen and the second display screen are in a working state.

Figure 3:
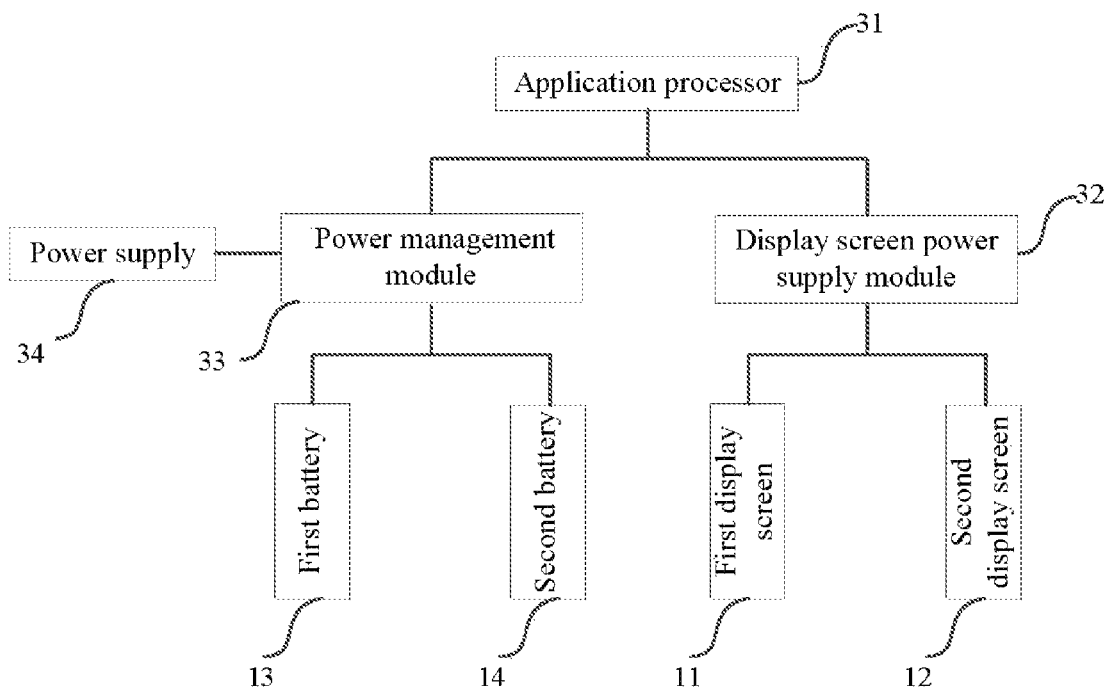
FIG. 3 is a schematic diagram showing a structure of a dual-screen terminal according to an embodiment of the present disclosure.

FIG. 3 is a schematic diagram showing a structure of a dual-screen terminal according to an embodiment of the present disclosure.

As shown in FIG. 3, the dual-screen terminal may include an application processor 31, a display screen power supply module 32, a power management module 33, a power supply 34, a first display screen 11, a second display screen 12, a first battery 13, and a second battery 14.

The application processor 31 is connected to the display screen power supply module 32 and the power management module 33, respectively. The power supply 34 is connected to the power management module 33. The display screen power supply module 32 is connected to the first display screen 11 and the second display screen 12, respectively. The power management module 33 is connected to the first battery 13 and the second battery 14, respectively.

The application processor 31 is used to detect a working state of the display screen power supply module 32, to determine whether the first display screen 11 and the second display screen 12 are working, and to notify the power management module 33 to charge and discharge the corresponding first battery 13 and/or second battery 14. The display screen power supply module 32 is used to supply power to the first display screen 11 and the second display screen 12 so as to ensure that the display screens can work independently and normally.

In practical applications, the application processor 31 determines whether the display screen power supply module 32 is enabled to confirm a working state of the first display screen and the second display screen. For example, an enable signal of the first display screen 11 is 1, indicating that the first display screen 11 is in a working state; an enable signal of the first display screen 11 is 0, indicating that the first display screen 11 is not in a working state; an enable signal of the second display screen 12 is 1, indicating that the second display screen 12 is in a working state; an enable signal of the second display screen 12 is 0, indicating that the second display screen 12 is not in a working state.

Returning to FIG. 2, at step S202, it is determined whether the dual-screen terminal is in a charging state.

As shown in FIG. 3, in the dual-screen terminal, the power supply 34 is connected to the power management module 33, and the power management module 33 is connected to the application processor 31. Therefore, the power management module 33 determines whether the external power supply 34 is connected, and the application processor 31 can determine, from the power management module 33, whether the power management module 33 is connected to the power supply 34, so as to obtain a determination result of whether the dual-screen terminal is in a charging state.

At step S203, in response to determining that the dual-screen terminal is in a charging state, the first battery and the second battery are controlled to be charged according to the state identifier of the first display screen and the state identifier of the second display screen.

It can be determined, from steps S201 and S202, whether the first display screen and the second display screen are in a working state and whether the power supply is supplying power to the dual batteries. When it is determined that the external power supply is connected, it means that the external power supply is supplying power to the batteries, thus indicating that the dual-screen terminal is in a charging state. At this time, the charging process of the first battery and the second battery can be controlled according to the state identifier of the first display screen and the state identifier of the second display screen.

In an embodiment, step S203 may include: in response to the first display screen and the second display screen both being in a working state or neither being in a working state, charging the first battery according to a first preset ratio of a charging current, and charging the second battery according to a second preset ratio of the charging current. The charging current is generated by a charging device connected to the dual-screen terminal.

In other words, according to the state identifier of the first display screen and the state identifier of the second display screen, it can be determined that the first display screen and the second display screen both are in a working state or neither are in a working state. At this time, the first battery is charged according to a first ratio of a charging current of a charging device, and the second battery is charged according to a second ratio of the charging current of the charging device. For example, the first ratio is 40% and the second ratio is 60%, which is not specifically limited in this embodiment of the present disclosure.

In other embodiments, step S203 may include: in response to the first display screen being in a working state and the second display screen not being in a working state, charging the second battery according to a third preset ratio of a charging current, and charging the first display screen according to a fourth preset ratio of the charging current. The third preset ratio is greater than the fourth preset ratio, and the charging current is generated by a charging device connected to the dual-screen terminal.

When only one display screen is in a working state and the other display screen is not in a working state, the third preset ratio may be, for example, 100%, and the fourth preset ratio may be, for example, 0. Understandably, charging the battery closer to the non-working display screen and not charging the battery closer to the working display screen can prevent the superimposition of heat generated by the batteries and the display screens, thereby reducing heat generated by charging and discharging the dual-battery terminal.

At step S204, in response to determining that the dual-screen terminal is not in a charging state, it is controlled whether the first battery and the second battery supply power to the dual-screen terminal according to the state identifier of the first display screen and the state identifier of the second display screen.

It can be determined, from steps S201 and S202, whether the first display screen and the second display screen are in a working state and whether the power supply is supplying power to the dual batteries. When it is determined that the external power supply is not connected, it means that no external power supply is supplying power to the batteries, thus indicating that the dual-screen terminal is not in a charging state. At this time, the first battery and the second battery supply power to the dual-screen terminal. It is possible to control whether the first battery and the second battery supply power to the dual-screen terminal according to the state identifier of the first display screen and the state identifier of the second display screen.

In an embodiment, step S204 may include: in response to the first display screen and the second display screen both being in a working state or neither being in a working state, controlling both the first battery and the second battery to supply power to the dual-screen terminal.

In other words, according to the state identifier of the first display screen and the state identifier of the second display screen, it can be determined that the first display screen and the second display screen both are in a working state or neither are in a working state. At this time, both the first battery and the second battery are controlled to supply power to the dual-screen terminal.

In other embodiments, step S204 may include: in response to the first display screen being in a working state and the second display screen not being in a working state, controlling the second battery to supply power to the dual-screen terminal and controlling the first battery not to supply power to the dual-screen terminal.

When only one display screen is in a working state and the other display screen is not in a working state, controlling the battery close to the non-working display screen to supply power to the dual-screen terminal and controlling the battery close to the working display screen not to supply power to the dual-screen terminal can prevent the superimposition of heat generated by the batteries and the display screens, thereby reducing heat generated by charging and discharging the dual-battery terminal.

Figure 4:
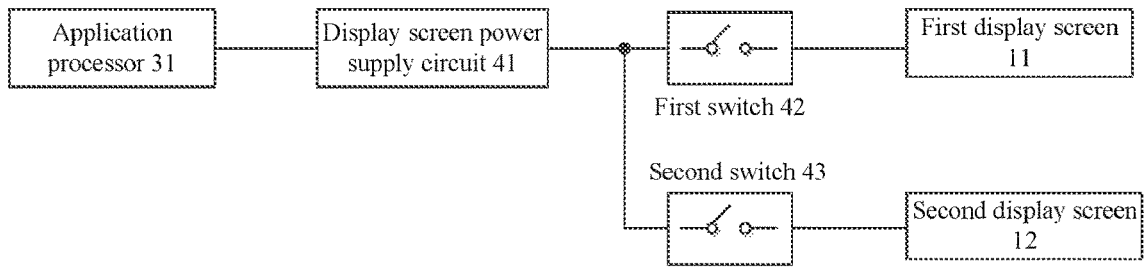
FIG. 4 is a schematic diagram showing a structure of a display screen power supply circuit according to an embodiment of the present disclosure.

FIG. 4 is a schematic diagram showing a structure of a display screen power supply circuit according to an embodiment of the present disclosure.

FIG. 4 shows the display screen power supply module 32 shown in FIG. 3 and composed of a single display screen power supply circuit and a switch circuit. The application processor 31 is connected to a display screen power supply circuit 41. The display screen power supply circuit 41 is connected to a first switch 42 and a second switch 43, respectively. The first switch 42 is connected to the first display screen 11, and the second switch 43 is connected to the second display screen 12. The working states of the two display screens are controlled by the switches, respectively. The first switch 42 and the second switch 43 may be two single-pole single-throw switches, or may be a single-pole double-throw switch or a combination of transistor switches.

Figure 5:
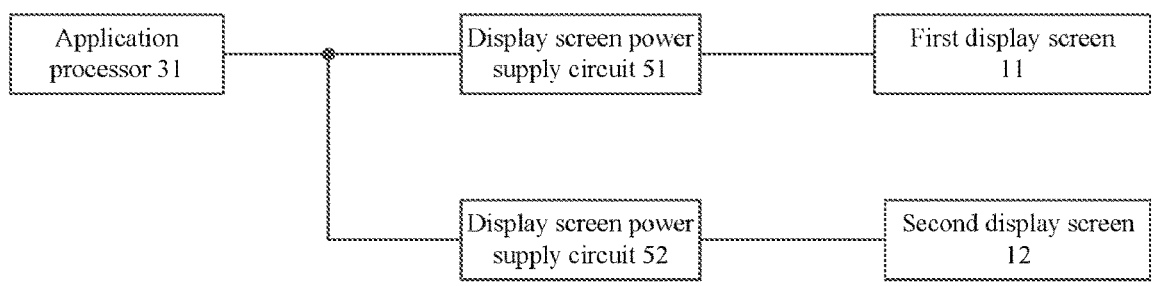
FIG. 5 is another schematic diagram showing a structure of a display screen power supply circuit according to an embodiment of the present disclosure.

FIG. 5 is another schematic diagram showing a structure of a display screen power supply circuit according to an embodiment of the present disclosure.

FIG. 5 shows the display screen power supply module 32 shown in FIG. 3 and composed of two display screen power supply circuits. The application processor 31 controls the two display screen power supply circuits 51 and 52, respectively, and the display screen power supply circuit 51 and the display screen power supply circuit 52 supply power to the first display screen 11 and the second display screen 12, respectively.

In an embodiment, the display screen power supply circuit 41, the display screen power supply circuit 51, and the display screen power supply circuit 52 may be LCD backlight power supply circuits, AMOLED screen power supply circuits, or a combination thereof.

Figure 6:
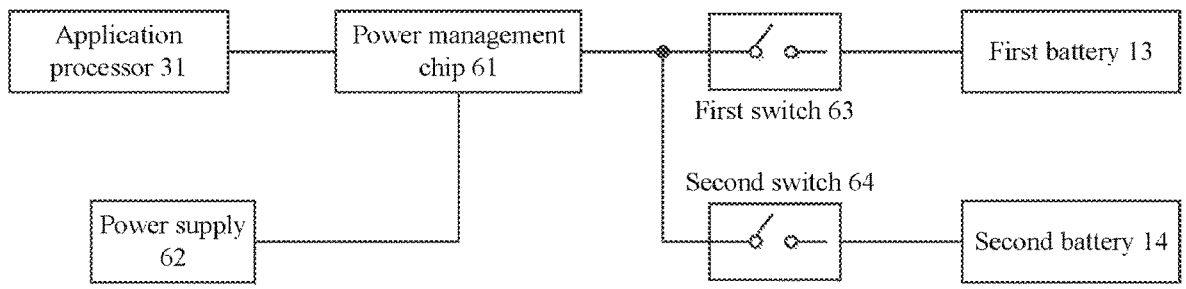
FIG. 6 is a schematic diagram showing a structure of a power supply according to an embodiment of the present disclosure.

FIG. 6 is a schematic diagram showing a structure of a power supply according to an embodiment of the present disclosure.

As shown in FIG. 6, the application processor 31 is connected to a power management chip 61. The power management chip 61 is connected to a power supply 62, a first switch 63, and the second switch 64, respectively. The first switch 63 is connected to the first battery 13, and the second switch 64 is connected to the second battery 14.

Figure 7:
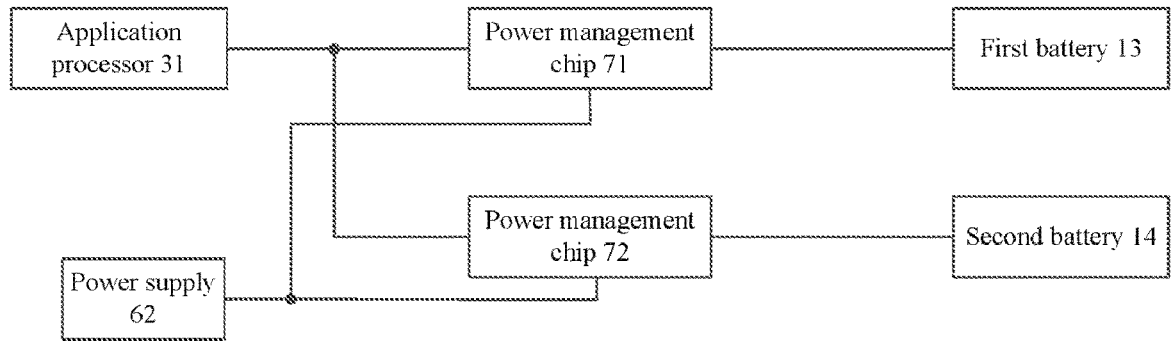
FIG. 7 is another schematic diagram showing a structure of a power supply according to an embodiment of the present disclosure.

FIG. 7 is another schematic diagram showing a structure of a power supply according to an embodiment of the present disclosure.

As shown in FIG. 7, the application processor 31 is connected to a power management chip 71 and a power management chip 72, respectively. The power management chip 71 and the power management chip 72 are respectively connected to a power supply 62. The power management chip 71 is connected to the first battery 13, and the power management chip 72 is connected to the second battery 14.

In FIG. 6, the power management chip 61 may supply, according to a command output by the application processor 31, power input from the power supply 62 to the first battery 13 and/or the second battery 14 for charging. When there is no external power supply, the power management chip 61 controls, according to a command of the application processor 31, the first battery 13 and/or the second battery 14 to discharge. The power management chip 61 may control the charging and discharging of the two batteries by means of the switches.

In FIG. 7, the power management chip 71 and the power management chip 72 may supply, according to a command output by the application processor 31, power input from the power supply 62 to the first battery 13 and/or the second battery 14 for charging. When there is no external power supply, the power management chip 71 and the power management chip 72 respectively control, according to a command of the application processor 31, the first battery 13 and/or the second battery 14 to discharge. The power management chip 71 and the power management chip 72 control the charging and discharging of the two batteries by means of the switches.

In an embodiment, the switches may be power transistors or dedicated chips.

For example, the first display screen 11 and the second display screen 12 may be used to display images, and may be liquid crystal displays (LCDs), active-matrix organic light emitting diodes (AMOLEDs) and other types of display screens.

For example, the first battery 13 is an energy storage element used to supply power to a system, is rechargeable, and is located under the first display screen 11; the second battery 14 is an energy storage element used to supply power to a system, is rechargeable, and is located under the second display screen 12; the power supply 62 is used to provide an input source to the first battery 13 and the second battery 14, and may be a power supply device such as a charger, a computer, or a DC source.

Figure 8:
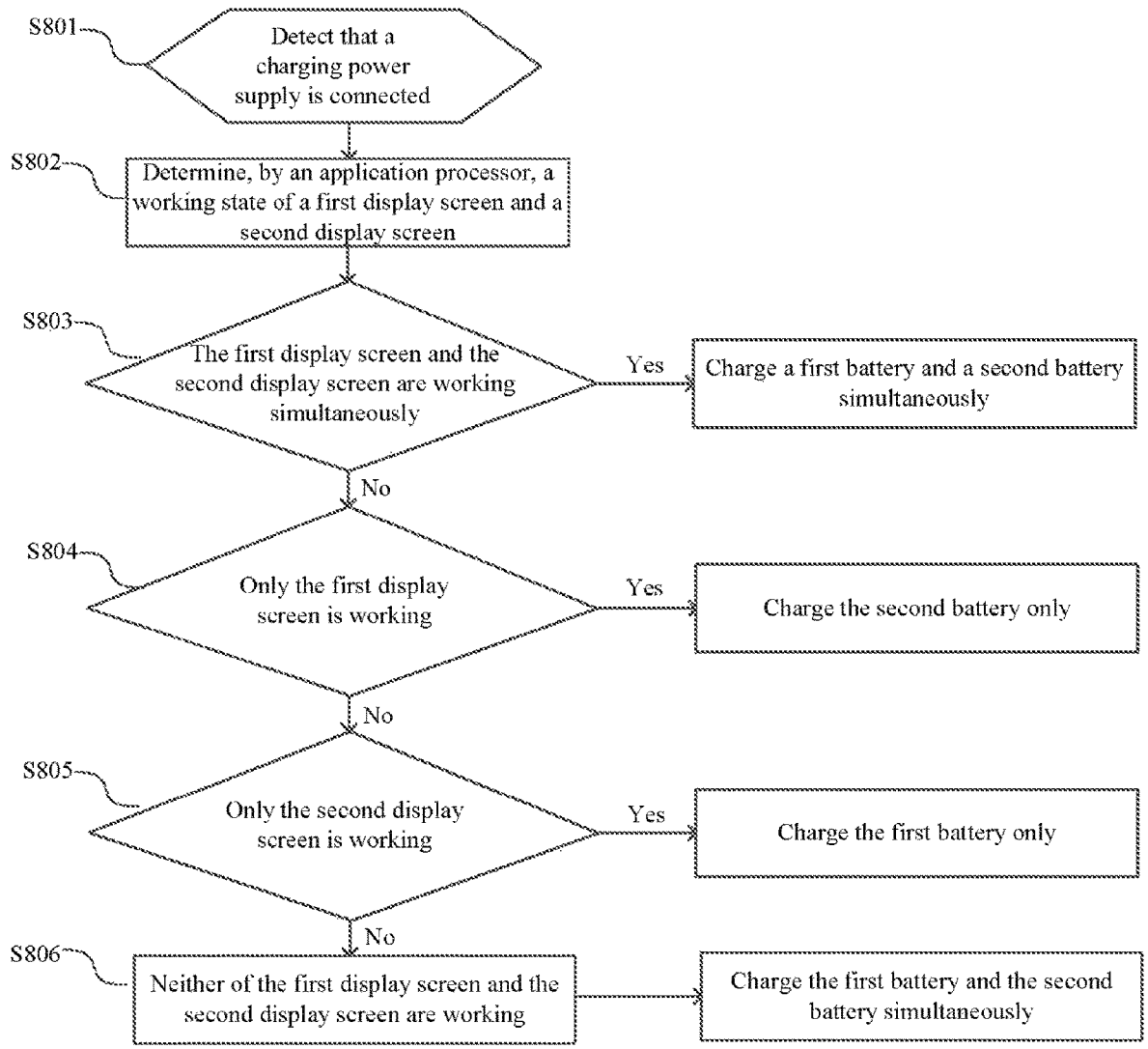
FIG. 8 is a schematic flowchart of a dual-battery charging method according to an embodiment of the present disclosure.

FIG. 8 is a schematic flowchart of a dual-battery charging method according to an embodiment of the present disclosure.

As shown in FIG. 8, the dual-battery charging method according to the embodiment of the present disclosure may include steps S801 to S806.

At step S801, when a power supply is connected to a terminal device, a power management module detects a valid power input and notifies an application processor to start a charging process.

At step S802, the application processor determines whether a first display screen and a second display screen are working by determining a state of a display screen power supply module.

At step S803, if the first display screen and the second display screen are working simultaneously, the first battery and the second battery are charged simultaneously, each being charged with 50% of a charging current; if not, it proceeds to a next determination condition S804.

At step S804, if only the first display screen is working, only the second battery is charged; if not, it proceeds to a next determination condition S805.

At step S805, if only the second display screen is working, only the first battery is charged; if not, it proceeds to a next step S806.

At step S806, if neither of the first display screen and the second display screen are working, the first battery and the second battery are charged simultaneously, each being charged with 50% of a charging current.

Figure 9:
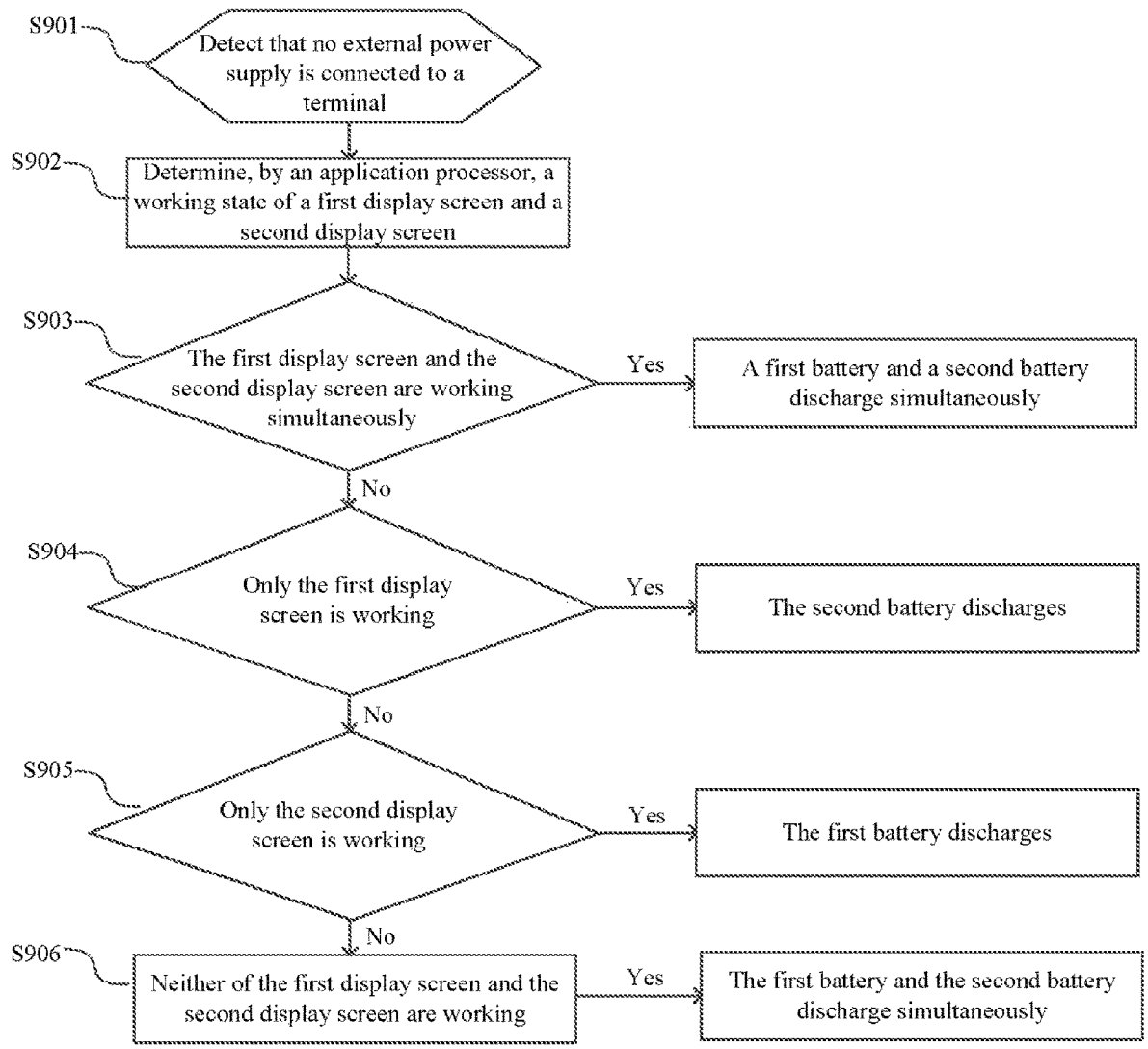
FIG. 9 is a schematic flowchart of a dual-battery power supplying method according to an embodiment of the present disclosure.

FIG. 9 is a schematic flowchart of a dual-battery power supplying method according to an embodiment of the present disclosure.

As shown in FIG. 9, the dual-battery power supplying method according to the embodiment of the present disclosure may include steps S901 to S906.

At step S901, an application processor determines that no valid power supply is connected to a system.

At step S902, the application processor determines whether a first display screen and a second display screen are working by determining a state of a display screen power supply module.

At step S903, if the first display screen and the second display screen are working simultaneously, a first battery and a second battery supply power to the system simultaneously; if not, it proceeds to a next determination condition S904.

At step S904, if only the first display screen is working, the second battery is used to supply power to the system; if not, it proceeds to a next determination condition S905.

At step S905, if only the second display screen is working, the first battery is used to supply power to the system; if not, it proceeds to a next step S906.

At step S906, if neither of the first display screen and the second display screen are working, the first battery and the second battery supply power to the system simultaneously.

Through the above examples, the superposition of the heating of display screens and the heating temperature of battery charging and discharging is avoided without increasing hardware cost, thereby reducing the heating temperature of a terminal during dual-battery charging and discharging. In addition, a reasonable charging and discharging strategy can reduce the heating temperature of a terminal, improve the safety performance of a product, and enhance user experience.

According to the dual-battery charging and discharging method used for a dual-screen terminal provided by the embodiment of the present disclosure, by obtaining the state identifier of the first display screen and the state identifier of the second display screen, the charging and discharging of the first battery and the second battery are controlled or the first battery and the second battery are controlled whether to supply power to the dual-screen terminal, so that the states of the first battery and the second battery can be flexibly controlled according to the states of the first display screen and the second display screen so as to avoid the effect on normal charging and discharging of the dual batteries while reducing heat generated by charging and discharging the dual-battery terminal.

Based on the same inventive concept, an embodiment of the present disclosure further provides a dual-battery charging and discharging apparatus used for a dual-screen terminal. The dual-screen terminal may include a first display screen, a second display screen, a first battery, and a second battery. The first battery is placed on a back surface of the first display screen, and the second battery is placed on a back surface of the second display screen.

Figure 10:
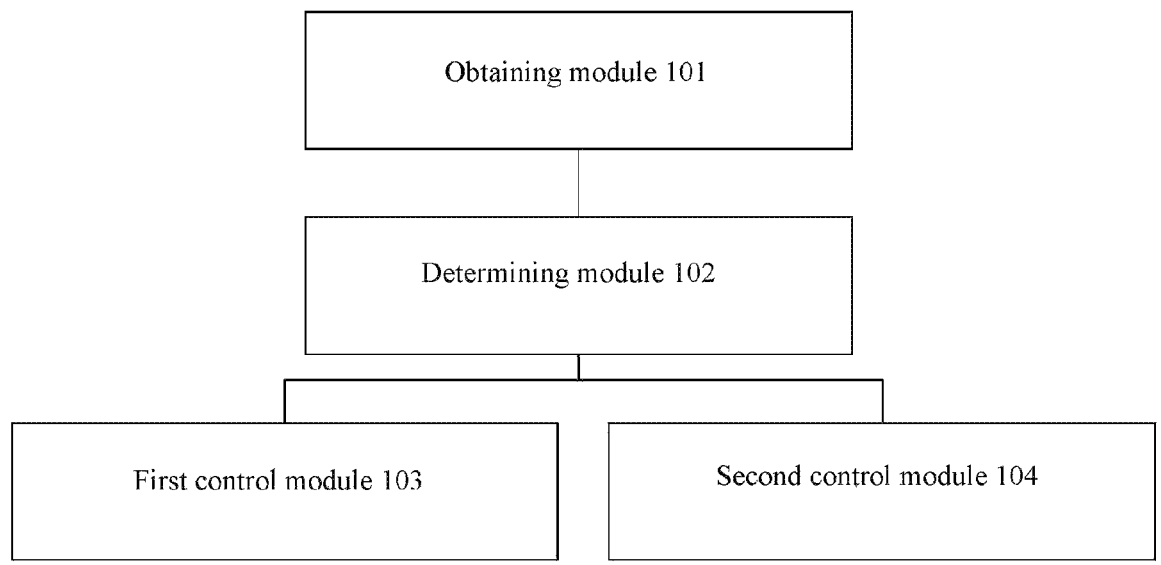
FIG. 10 is a schematic diagram showing a structure of a dual-battery charging and discharging apparatus according to an embodiment of the present disclosure.

FIG. 10 is a schematic diagram showing a structure of a dual-battery charging and discharging apparatus according to an embodiment of the present disclosure.

As shown in FIG. 10, the dual-battery charging and discharging apparatus according to the embodiment of the present disclosure includes an obtaining module 101, a determining module 102, a first control module 103, and a second control module 104.

The obtaining module 101 is configured to obtain a state identifier of a first display screen and a state identifier of a second display screen. The state identifier of the first display screen is used to indicate whether the first display screen is in a working state, and the state identifier of the second display screen is used to indicate whether the second display screen is in a working state. The determining module 102 is connected to the obtaining module 101, and is configured to determine whether the dual-screen terminal is in a charging state. The first control module 103 is connected to the determining module 102, and is configured to control the first battery and the second battery to be charged according to the state identifier of the first display screen and the state identifier of the second display screen in response to determining that the dual-screen terminal is in a charging state. The second control module 104 is connected to the determining module 102, and is configured to control whether the first battery and the second battery supply power to the dual-screen terminal according to the state identifier of the first display screen and the state identifier of the second display screen in response to determining that the dual-screen terminal is not in a charging state.

In an embodiment, the first control module 103 is configured to charge the first battery according to a first preset ratio of a charging current and charge the second battery according to a second preset ratio of the charging current in response to the first display screen and the second display screen both being in a working state or neither being in a working state. The charging current is generated by a charging device connected to the dual-screen terminal.

In an embodiment, the first control module 103 is configured to charge the second battery according to a third preset ratio of a charging current and charge the first battery according to a fourth preset ratio of the charging current in response to the first display screen being in a working state and the second display screen not being in a working state. The third preset ratio is greater than the fourth preset ratio, and the charging current is generated by a charging device connected to the dual-screen terminal.

In an embodiment, the second control module 104 is configured to control both the first battery and the second battery to supply power to the dual-screen terminal in response to the first display screen and the second display screen both being in a working state or neither being in a working state.

In an embodiment, the second control module 104 is configured to control the second battery to supply power to the dual-screen terminal and control the first battery not to supply power to the dual-screen terminal in response to the first display screen being in a working state and the second display screen not being in a working state.

Based on the same inventive concept, an embodiment of the present disclosure further provides a dual-screen terminal.

Figure 11:
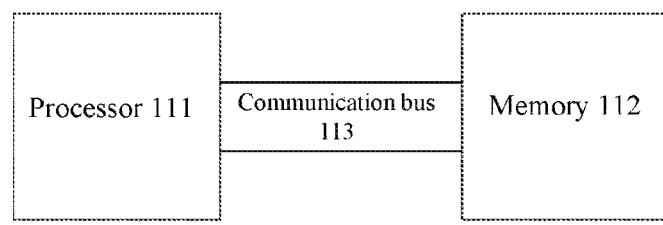
FIG. 11 is another schematic diagram showing a structure of a dual-screen terminal according to an embodiment of the present disclosure.

FIG. 11 is another schematic diagram showing a structure of a dual-screen terminal according to an embodiment of the present disclosure.

As shown in FIG. 11, the dual-screen terminal according to the embodiment of the present disclosure includes a processor 111, a memory 112, and a communication bus 113. The communication bus 113 is used to implement connection and communication between the processor 111 and the memory 112. When executing a computer program stored in the memory 112, the processor 111 may implement the dual-battery charging and discharging method used for a dual-screen terminal according to various embodiments of the present disclosure.

An embodiment of the present disclosure further provides a storage medium having stored thereon a computer program. When the computer program is executed by a processor, the processor implements the dual-battery charging and discharging method used for a dual-screen terminal according to various embodiments of the present disclosure.

It should be noted that, the terms "including", "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

From the embodiments described above, those skilled in the art can clearly understand that the methods described in the above embodiments may be implemented using software with an essential universal hardware platform, and certainly may also be implemented by hardware, but in most cases, the former is a preferred implementation manner. Based upon such understanding, the technical solutions of the present disclosure may be embodied in the form of a software product which is stored in a storage medium (such as ROM/RAM, magnetic disk and optical disk) and which includes several instructions to cause a terminal device (which may be a mobile phone, a computer, a server, an air conditioner, a network device, etc.) to implement the methods according to the various embodiments of the present disclosure.

The embodiments of the present disclosure are described above in conjunction with the accompanying drawings, but the present disclosure is not limited to the above embodiments. The above embodiments are only illustrative and not restrictive. With the teachings from the present disclosure, those of ordinary skill in the art can make many variations without departing from the spirit of the present disclosure and the scope of protection of the claims, and all these variations fall within the scope of protection of the present disclosure.

The invention claimed is:

1. A dual-battery charging and discharging method used for a dual-screen terminal, the dual-screen terminal comprising a first display screen, a second display screen, a first battery, and a second battery, wherein the first battery is placed at a back surface of the first display screen, and the second battery is placed at a back surface of the second display screen, a distance between the first display screen and the first battery is smaller than that between the second display screen and the first battery, and a distance between the second display screen and the second battery is smaller than that between the first display screen and the second battery, the dual-battery charging and discharging method comprising:

obtaining a state identifier of the first display screen and a state identifier of the second display screen, wherein the state identifier of the first display screen is used to indicate whether the first display screen is in a working state, and the state identifier of the second display screen is used to indicate whether the second display screen is in a working state;

determining whether the dual-screen terminal is in a charging state;

in response to determining that the dual-screen terminal is in a charging state, controlling the first battery and the second battery to be charged according to the state identifier of the first display screen and the state identifier of the second display screen; and in response to determining that the dual-screen terminal is not in a charging state, controlling whether the first battery and the second battery supply power to the dual-screen terminal according to the state identifier of the first display screen and the state identifier of the second display screen, wherein a step of controlling the first battery and the second battery to be charged according to the state identifier of the first display screen and the state identifier of the second display screen comprises:

in response to the first display screen being in a working state and the second display screen not being in a working state, charging the second battery according to a third preset ratio of a charging current and charging the first battery according to a fourth preset ratio of the charging current, the third preset ratio and the fourth preset ratio being different from a first preset ratio for charging the first battery and a second preset ratio for charging the second battery in response to the first display screen and the second display screen both being in a working state or neither being in a working state; and the third preset ratio is greater than the fourth preset ratio, and the charging current is generated by a charging device connected to the dual-screen terminal.

2. The dual-battery charging and discharging method according claim 1, wherein in response to the first display screen and the second display screen both being in a working state or neither being in a working state, and charging the first battery according to the first preset ratio of a charging current and charging the second battery according to the second preset ratio of the charging current, the charging current is generated by a charging device connected to the dual-screen terminal.

3. The dual-battery charging and discharging method according claim 1, wherein a step of controlling whether the first battery and the second battery supply power to the dual-screen terminal according to the state identifier of the first display screen and the state identifier of the second display screen comprises:

in response to the first display screen and the second display screen both being in a working state or neither being in a working state, controlling the first battery and the second battery to supply power to the dual-screen terminal.

4. The dual-battery charging and discharging method according claim 1, wherein a step of controlling whether the first battery and the second battery supply power to the dual-screen terminal according to the state identifier of the first display screen and the state identifier of the second display screen comprises:

in response to the first display screen being in a working state and the second display screen not being in a working state, controlling the second battery to supply power to the dual-screen terminal and controlling the first battery not to supply power to the dual-screen terminal.

5. A dual-screen terminal, comprising a first display screen, a second display screen, a first battery, and a second battery, wherein the first battery is placed at a back surface of the first display screen, and the second battery is placed at a back surface of the second display screen, the dual-screen terminal further comprising a processor and a memory, wherein the memory stores therein a computer program, and when the processor executes the computer program, the processor implements the dual-battery charging and discharging method according to claim 1.

6. A non-transitory storage medium storing thereon a computer program, wherein when the computer program is executed by a processor, the processor implements the dual-battery charging and discharging method according to claim 1.

* * * * *